Aug. 7, 1928. 1,679,495
T. F. RAINSFORD
BRAKE CONSTRUCTION
Original Filed April 6, 1925    3 Sheets-Sheet 1

Inventor
Thomas F. Rainsford

By Whitmore Hubbert Whitmore & Belknap
Attorneys

Aug. 7, 1928.
T. F. RAINSFORD
1,679,495
BRAKE CONSTRUCTION
Original Filed April 6, 1925   3 Sheets-Sheet 2
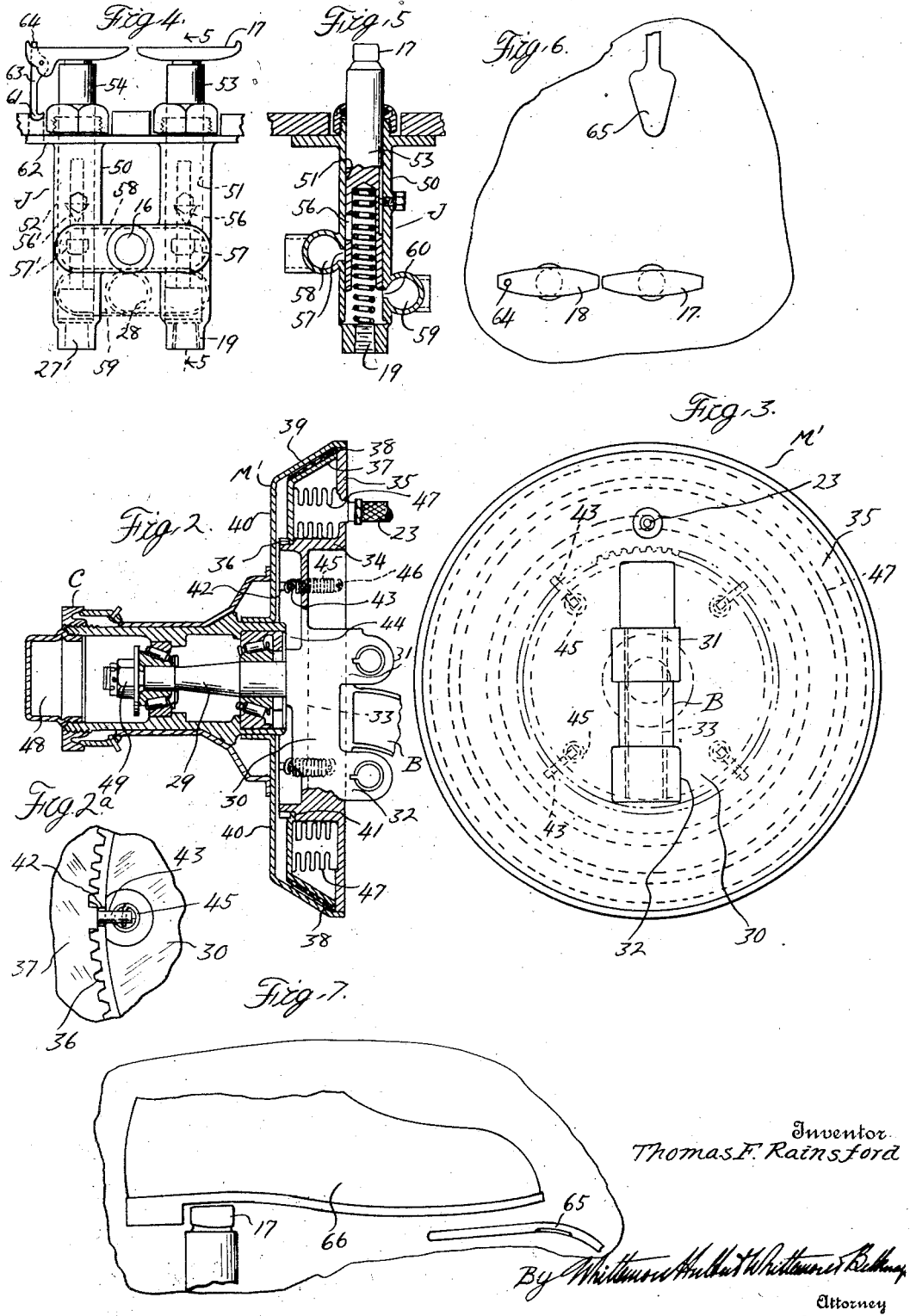
Inventor
Thomas F. Rainsford Aug. 7, 1928.
T. F. RAINSFORD
1,679,495
BRAKE CONSTRUCTION.
Original Filed April 6, 1925 3 Sheets-Sheet 3
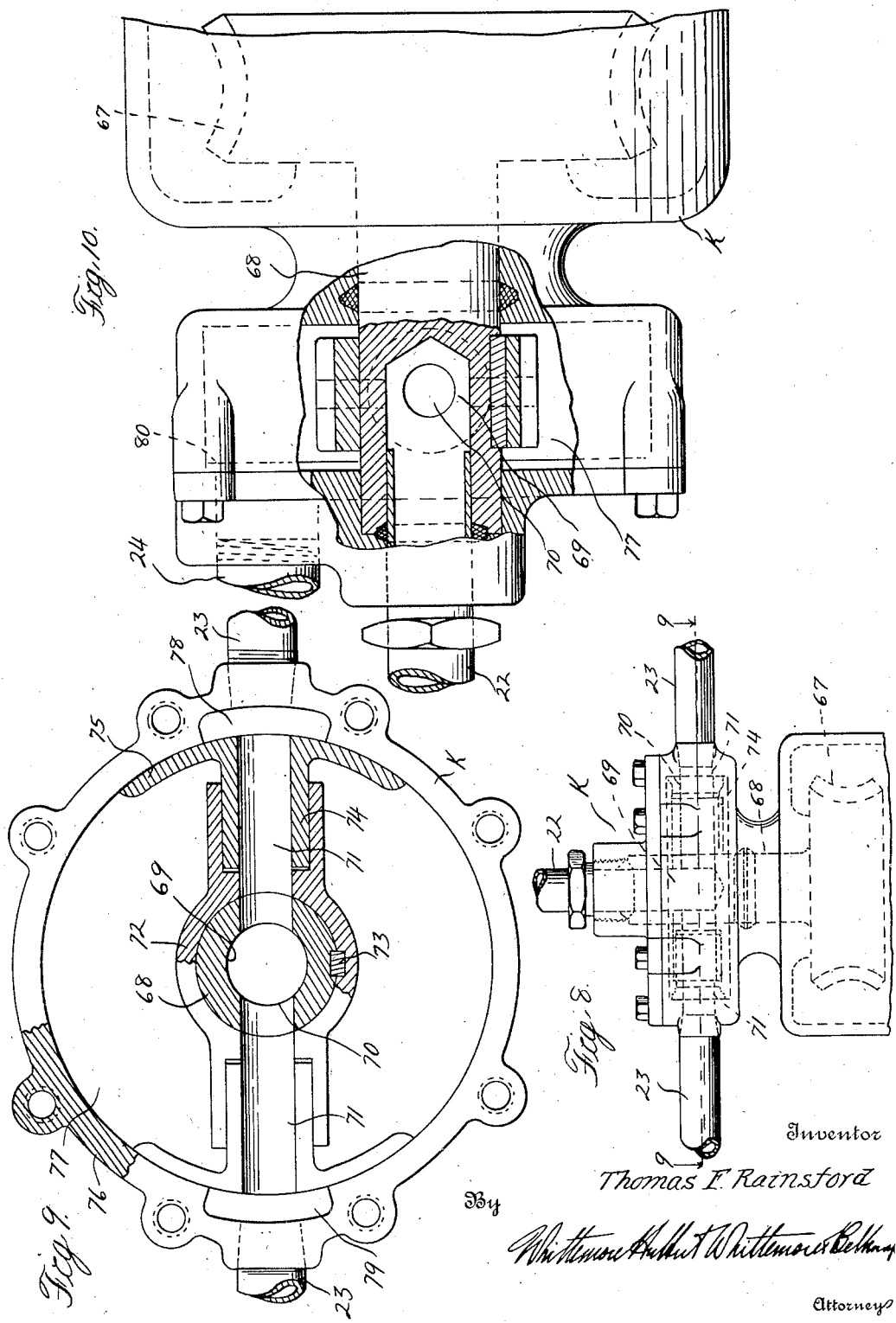
Inventor
Thomas F. Rainsford
By
Attorneys Patented Aug. 7, 1928.

1,679,495

UNITED STATES PATENT OFFICE.

THOMAS F. RAINSFORD, OF DETROIT, MICHIGAN, ASSIGNOR OF ONE-FOURTH TO THOMAS C. WHITEHEAD, OF DETROIT, MICHIGAN.

BRAKE CONSTRUCTION.

Original application filed April 6, 1925, Serial No. 21,137. Divided and this application filed December 17, 1925. Serial No. 76,072.

The invention relates to vehicle brakes and more particularly to a system of operating brakes in connection with motor vehicles. One of the objects of the invention is to provide means for braking the steering as well as the non-steering wheels of a motor vehicle. A further feature of the invention resides in the provision of means for relieving the braking force applied to the steering wheels after a predetermined steering angle has been reached. A further object of the invention is to provide a braking system including a service brake control for normal operation of the four wheels of the vehicle and also an emergency brake control for braking the propeller shaft or the like of the motor vehicle. The invention further provides the service and emergency brake control pedals in such a relation that both pedals may be readily operated simultaneously or selectively with one foot of the operator. A further feature is the provision of an arrangement of the accelerator pedal and the brake control pedal so that either is readily under control without requiring the operator to shift his foot laterally or longitudinally. A further provision is a fluid brake system including means for maintaining a desired pressure of fluid for use in applying the braking force to the vehicle wheels and the power shaft. A still further object is to provide a fluid brake construction associated with a vehicle wheel whereby the parts of the brake are readily demountable and accessible for repair, inspection and the like.

With these and other objects in view, the invention resides in the novel features of construction and combination and arrangements of parts as more fully hereinafter described and claimed.

This application is a division of my copending application Serial Number 21,137, filed April 6, 1925.

In the drawings in which like reference characters indicate corresponding parts, Figure 1 is a diagrammatic view showing the operation of the various parts of the braking system;

Figure 2 is a section view through one of the steering wheels of the vehicle showing the construction of one of the brake units;

Figure 2^A is a detail fragmentary view showing the connection between the braking element and one of the springs acting to release the same;

Figure 3 is a rear elevation of the brake unit shown in Figure 2;

Figure 4 is a detail view showing in elevation the main control device;

Figure 5 is a section view along 5—5 of Figure 4;

Figure 6 is a plan view showing the relation of the various control pedals;

Figure 7 is a detail elevation view showing the manner in which the service control pedal and the accelerator control pedal may be selectively operated without requiring longitudinal or lateral shifting of the foot of the operator;

Figure 8 is a detail elevation view of the steering wheel control device;

Figure 9 is a view along 9—9 of Figure 8; and

Figure 10 is a side elevation view partly in section of the steering wheel control device shown in Figure 8.

Figure 1:
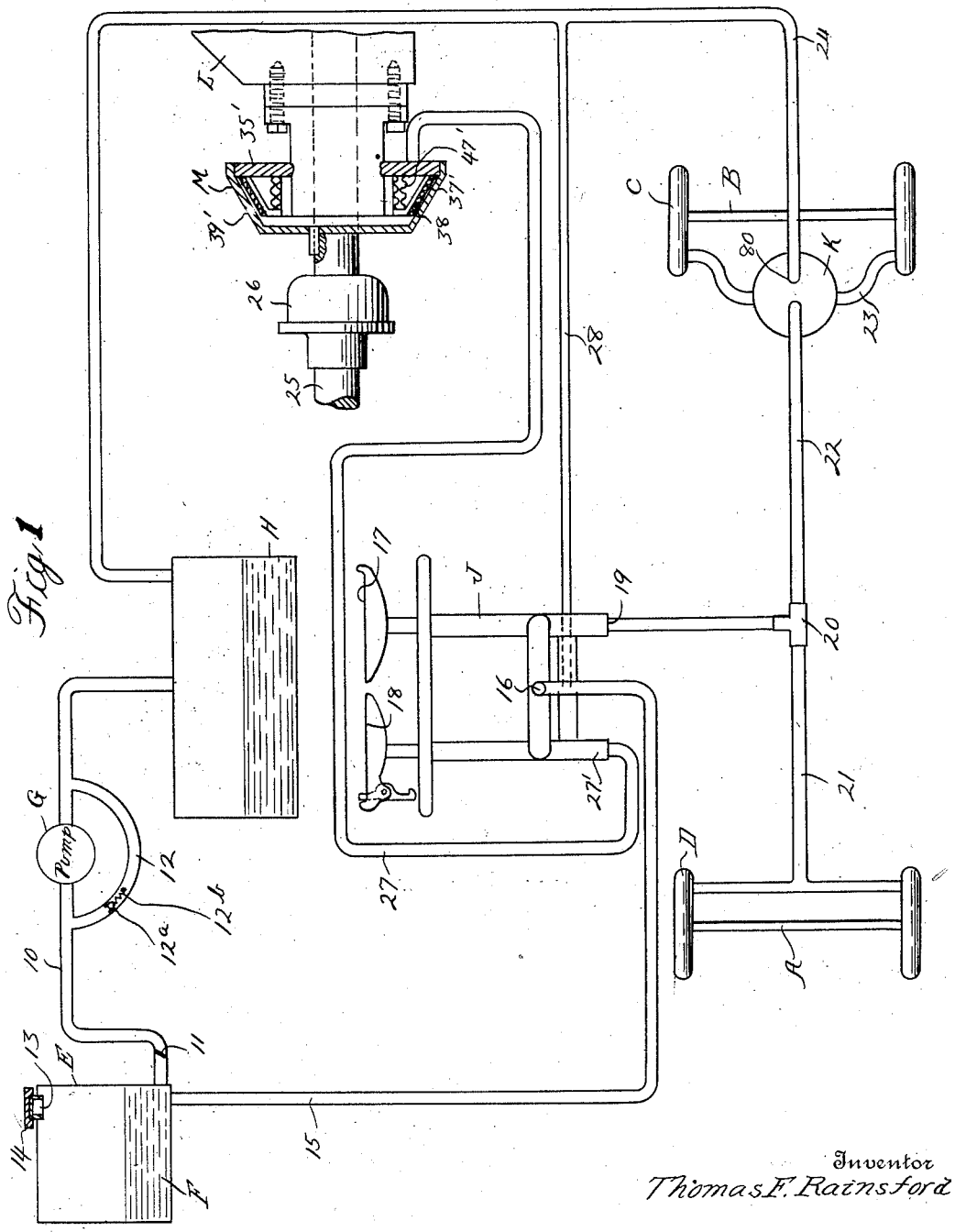

Referring to Figure 1, reference character A indicates the rear axle of a motor vehicle, B indicating the front axle thereof. Mounted on the front and rear axles respectively are the steering wheels C and the non-swivelled or non-steering wheels D. E indicates a supply tank for storing under pressure a suitable fluid indicated at F, such as oil, or the like. G indicates a pump for conducting the fluid from the sump H through the conduit 10 past the check valve 11 and thence to the supply tank F. 12 indicates a by-pass or shunt pipe around the pump G, this pipe having a check valve 12$^a$ normally seated by a spring 12$^b$. 13 indicates a vent in the supply tank normally closed by a suitable cap or the like 14. For maintaining a desired pressure of fluid in the supply tank F, the operation of this part of the device is as follows: The pump G forces fluid from the sump H into the supply tank F, thus compressing a certain amount of air above the fluid in tank F determinable by the cap 14. By releasing the cap 14 a certain amount of the trapped air will be allowed to escape from the supply tank and in this manner the desired pressure in the supply tank may be obtained so that when such pressure is reached the capacity of pump G will not permit additional fluid to be forced past the check valve 11. Thereafter, the fluid will unseat valve 12$^a$ against the action of spring 12$^b$ so that the fluid will merely be by-passed around the pump by reason of the shunt pipe 12, the check valve 11 preventing the escape of the fluid under pressure back toward the pump. The spring 12$^b$ is sufficiently strong to keep the valve 12$^a$ seated until the predetermined desired pressure is reached in the supply tank. 15 indicates a conduit connected at 16 with the main control device J. This device as will be hereafter described, includes a service brake control pedal 17 and an emergency control pedal 18. The pedal 17 is adapted to control the supply of fluid from the pipe or conduit 15 through the service outlet 19 and thence to the T-coupling 20. From the coupling 20 the braking fluid is supplied rearwardly through the pipe 21 to act on the brake units associated with the rear wheels D for applying a braking force to the latter as will be hereafter described. Fluid also is conducted forwardly from the T-coupling 20 through the pipe 22 to the steering wheel control device K. This latter device is adapted to conduct the fluid through the branch pipes 23 to act on the brake units associated with the front wheels C for braking the same. As will be hereafter apparent the steering wheel control device K also includes means whereby the fluid may be applied to the brake units associated with the front wheels equally up to a predetermined amount of turning of said wheels, after which amount of turning the fluid will be automatically released from the brake units and will travel back to the sump H by reason of the auxiliary return pipe 24. L indicates a transmission housing through which the power shaft 25 passes in accordance with the usual construction. 26 indicates a universal joint included in the length of the power shaft. M indicates a power shaft brake unit whereby a braking force may be applied to the power shaft by reason of fluid supplied from the pipe 27. The supply of fluid through pipe 27 is controlled by the emergency control pedal 18 which acts to conduct fluid from the supply pipe 15 through the emergency outlet 27′. The construction of the main control device J is such that on release of the control pedals 17 and 18, the fluid from the wheel brakes and the power shaft brake unit M respectively will return through the outlets 19 and 27′ and thence pass through the main return 28 to the sump H. Referring to Figures 2 and 3, I have illustrated one of the brake units M′ which is shown in connection with one of the steering wheels C. The steering wheel C is rotatably mounted on the hub 29, the hub being secured to the casting 30 which is provided with the upper and lower bearing portions 31 and 32 for receiving the king pin 33 whereby the wheel C is swivelly mounted in accordance with the customary practice of mounting steering wheels. The casting 30 is provided with a flange part 34 and at right angles thereto is a second flanged portion 35. The flange 34 is provided with laterally extending key ways or gear teeth 36 for slidably receiving the frusto-conical braking element 37. The braking element 37 is provided with a strip of braking material 38 adapted to contact with the frusto-conical flanged brake drum 39 preferably integrally connected with a cover plate 40 carried by the wheel C. 41 indicates a shoulder forming a stop for the braking element 37 when the latter is in disengaged position with respect to the brake drum 39. At suitable intervals as shown most clearly in Figures 2 and 2$^A$, the casting 30 is provided with slots 42 for accommodating pins 43 which pins have one end secured in the brake element 37 and have their opposite ends extending inwardly of the recessed portion 44 of the casting 30. The pins 43 are each engaged by a resilient member such as the spring 45. One end of each spring 45 is rigidly secured at 46 to the casting 30. The spring 45 is preferably detachably engaged with the pins 43 whereby upon removal of the wheel C from its hub 29, the pins 43 will be readily accessible for engagement or disengagement of the spring 45 and the pin 43 engaged thereby. By reason of the springs 45, it will be noted that the braking element 37 is normally urged against shoulder 41 in a position of disengagement with respect to the brake drum 39. 47 indicates an annular expansible chamber surrounding the flange 34, the expansible chamber 47 having one end bearing against the relatively fixed flange 35 and having its opposite end bearing against the axially slidable braking element 37. Fluid under pressure from the pipe 23 is adapted to enter the expansible chamber 47 to act on the braking element 37 whereby the latter is engaged with the brake drum 39 for applying a braking force to the wheel C.

The wheel C is preferably of the quick demountable type by reason of the nuts 48 and 49 which normally retain the wheel upon the hub 29. The cover plate 40 normally forms a housing in connection with the recess 44 whereby the connection between the springs 45 and pins 43 are inaccessible and are protected from dust, dirt and the like. It will be noted however, that upon removal of the wheel C from hub 29, the cover plate 40 being removed therewith, the connection between the pins 43 and springs 45 will be readily accessible, whereby these parts may be disconnected. The braking element 37 as well as the other parts of the brake unit M' may then be readily removed for purpose of inspection, replacement and the like.

While I have shown the brake unit M' in connection with one of the steering wheels of the motor vehicle, it should be understood that the brake units associated with the rear wheels D and the brake unit M associated with the power shaft 25 are similarly constructed. For example, the brake unit M is provided with a flange 35' rigidly mounted on the transmission housing L, the annular expansible chamber 47' bearing against the flange 35' to urge the braking element 37' into engagement with the brake drum 39' carried by the power shaft 25. In this manner fluid under pressure introduced through the pipe 27 will enter the expansible chamber 47' to apply a braking force on the power shaft 25.

Referring to Figures 4 and 5, I have shown in detail the construction of the main control device J. This control device preferably comprises a main casting 50 which is substantially H-shaped. The vertical portions of the casting 50 are bored at 51 and 52 respectively to slidably receive the control valve members 53 and 54. The valve member 53 is connected with the service control pedal 17 and is normally urged in an upward position as shown in Figures 4 and 5 by reason of a spring 55. The valve member 53 is provided with a port 56 adapted to register with the port 57 which communicates with the horizontal supply chamber 58. The chamber 58 is adapted to receive the fluid from supply tank F by its connection at 16 with the supply pipe 15. 59 indicates a release chamber which is connected by a port 60 with the service outlet 19. The valve member 54 is similarly constructed, being provided with a port 56' adapted to register with the port 57' which also communicates with the supply chamber 58. The valve member 54 is also adapted to control the passage of fluid from the outlet 27' to the release chamber 59 by reason of a port similar to that shown at 60. The emergency control pedal 18 may be provided with a detent 61 adapted to engage a shoulder 62 to lock the valve member 54 in its depressed position. For engaging the detent 61 with the shoulder 62, the detent rod 63 may be provided with an actuating lug 64 engageable by the foot of the operator.

In describing this part of my invention when it is desired to apply a braking pressure to the vehicle wheels, the operator will engage the service control pedal with his foot and cause the valve member 53 to move downwardly against the action of the spring 55. In this manner, ports 56 and 57 will be aligned whereby fluid from the supply tank F will pass from the supply chamber 58 through the ports 57 and 56 and thence to the service outlet 19. The downward movement of the valve member 53 will serve to cut off the communication of the release chamber 59 with the service outlet 19 through the port 60. The fluid from service outlet 19 will pass to the T-coupling 20 and thence to the front and rear brakes C and D as aforesaid. Upon release of the service control pedal 17, the spring 55 will urge the valve member 53 upwardly into the position shown in Figures 4 and 5 whereby the ports 57 and 56 will be restored to their former position, thus shutting off the supply of fluid to the wheel brakes. Simultaneously the service outlet 19 will be brought into communication with the release chamber 59 by reason of the port 60. Thus, the fluid pressure from the vehicle wheel brakes will be relieved, the fluid passing from the release chamber 59 through the main return pipe 28 to the sump H. As will be hereafter described, I prefer to automatically release the braking pressure applied to the front wheel brake C upon reaching a predetermined steering movement. When such a device is used, the fluid applied to the front wheel brake units is returned to the sump by the auxiliary return pipe 24 independently of the main control device J. In each instance, however, the fluid from the brake units associated with the rear wheels D will be returned to the sump by reason of the pipe 21, service outlet 19, main control device J and the main return pipe 28.

The operation of the emergency control pedal 18 for applying a braking force to the brake unit M is substantially similar to that described in connection with the service control pedal 17. Upon downward movement of the valve member 54, the ports 56', and 57' are registered to conduct fluid from the supply chamber 58 to the emergency outlet 27' and thence through the pipe 27 to the brake unit M. If it is desired to apply the brake for a considerable period of time as in parking the automobile, the detent 61 may be engaged with the shoulder 62 to hold the valve member 54 in its lowered position. When the valve member 54 is restored to its upward position the port 56' is disengaged from port 57' and the fluid from the brake unit M is allowed to escape from pipe 27, emergency outlet 27' thence to release chamber 59 and thereafter through the main return pipe 28 to the sump H.

Referring to Figure 6, 65 indicates the accelerator control pedal which may be of the usual construction whereby the passage of fuel to the engine is controlled. It will be noted that the accelerator control pedal 65 is located adjacent and aligned with the service control pedal 17 whereby as shown in Figure 7, the foot 66 of the operator may selectively engage the service control pedal and the accelerator control pedal by a slight rocking movement of the foot. Thus, the operator may engage either of these pedals without shifting his foot laterally or longitudinally thereby facilitating the operation of the automobile. This quick operation or control of the car which is afforded by the relative positioning of the accelerator and service control pedals will be especially useful in operating the car in congested traffic conditions, my invention making it possible to substantially instantly, either check the advance of the car, or cause the same to be moved by the engine.

The arrangement shown is also such that the emergency control pedal and the service control pedal may be either selectively engaged by the foot of the operator or these pedals 17 and 18 may be simultaneously engaged. This is possible by locating the pedals 17 and 18 close adjacent each other whereby the foot of the operator may be caused to bridge the pedals and cause simultaneous downward movement of the valve members 53 and 54. Referring to Figures 8, 9 and 10, 67 indicates the steering gear worm which is commonly used for applying a steering movement to the front wheels of the motor vehicle by reason of its connection with the usual steering post (not shown). The steering gear 67 is provided with an integral shaft 68, the upper end of which is bored at 69 to form a chamber for receiving the fluid from the pipe 22 which is connected with the T-coupling 20 as shown in Figure 1. The bored portion of the shaft 68 is provided with the diametrically opposite ports 70 which communicate with the oppositely extending conduits 71. The conduits 71 are formed by reason of the rotatable member 72 which is keyed at 73 with the shaft 68 and also by reason of the stems 74 of the arcuate shape valve shoes. The steering wheel control device K is provided with a circular shaped casing 76 providing a hollow chamber 77 within which the rotatable member 72 operates. 78 and 79 indicate ports in the casing 76 respectively communicating with the branch pipes 23 leading to the front wheel steering brakes C as shown in Figure 1. 80 indicates an opening from the chamber 77, the opening 80 communicating with the auxiliary return pipe 24 which leads to the sump H as shown in Figure 1.

In operation of this part of my invention with the parts in the position shown in Figure 9, fluid from the main control device J is adapted to pass upon actuation of the service control pedal 17 through the pipe 22 to the bored portion 69 and thence through the oppositely extending conduits 71, through ports 78 and 79 to the branch pipes 23 whereby the fluid is conducted to the brake units associated with each of the front wheels C. Upon release of the service control pedal 17 the fluid will pass from the brake units associated with the front wheels through the branch pipes 23 and thence back to the main control device J, main return pipe 28 and sump H. I have found that where brakes are used in connection with the steering wheels of an automobile there is a tendency for such brakes to bind when the brakes are applied during a steering movement of the wheels beyond a predetermined amount. Up to this predetermined amount, the full braking effort may be applied to the steering wheels without resulting injury or other detrimental effects to the brakes used in connection with the front wheels. It is also undesirable to apply the full braking force to the front wheels beyond a predetermined steering movement because of the difficulty in steering the wheels when they are positioned at relatively sharp angles. My invention includes means for automatically relieving the fluid pressure applied to the steering wheel brakes after the steering wheels have reached a predetermined angle of steering movement and again applying the brakes automatically when this angle is reduced. For accomplishing this purpose the valve shoes 75 are adapted to be moved by reason of their connection with the steering gear 67. When the steering gear 67 is operated to swivel the steering wheels C the valve shoes 75 together with the conduits 71 will be rotated with respect to the port 78. The port 78 is preferably somewhat wider circumferentially than the conduit 71 whereby the conduit 71 will continue to register with the ports 78 and 79 for a certain predetermined amount of movement of the rotatable member 72 which is actuated through the steering gear 67. However, after this predetermined amount of movement of the rotatable member 72 has been reached further steering movement will rotate the valve shoes 75 beyond the ports 78 and 79 to cause the flow of fluid through the conduit 71 to be stopped by reason of their being brought into engagement with the casing 76. Simultaneously the ports 78 and 79 will be caused to register with the chamber 77 of the steering wheel control device K, thus permitting the fluid from the front wheel brake units to pass through the branch pipes 22 into the chamber 77 and thence through opening 80 and auxiliary return pipe 24 to the sump H.

Instead of employing the steering wheel control device K it will be obvious that my invention may be readily used in connection with a braking system whereby the fluid is introduced to all four wheels of the motor vehicle without relieving the braking force to the steering wheels as described. Furthermore, if desired, the power shaft brake unit may be dispensed with. It is also obvious that other changes may be made in the system as described such as dispensing with either the rear or the front steering wheel brakes.

While it is believed that from the foregoing description the nature and advantages of my invention will be readily understood, I desire to have it understood that I do not limit myself to what is herein shown and described and that such changes may be resorted to when desired as fall within the scope of the claims.

What I claim as my invention is:—

1. The combination with a pair of steering wheels of fluid pressure operated means for braking the wheels equally in a straight ahead movement, means whereby the braking of the respective wheels is equal upon swivelling said steering wheels up to a predetermined steering movement, and means automatically operable upon a swivelling movement beyond said predetermined steering movement for relieving the braking force to said wheels.

2. The combination with a vehicle having a pair of swivelled steering wheels and a pair of nonswivelled wheels of fluid pressure operated means for braking the respective wheels equally in a straight ahead movement, means whereby the braking of the respective wheels is equal upon swivelling said steering wheels up to a predetermined steering movement, and means automatically operable upon a swivelling movement beyond the said predetermined steering movement for permitting a greater braking force to be applied to said non-swivelled wheels than to the other of said wheels.

3. The combination with a pair of steering wheels, of a fluid pressure operated means for braking said wheels, and means effective upon a steering movement of said wheels for automatically relieving the braking force applied to both of said wheels.

4. The combination with a pair of steering wheels of a fluid pressure operated brake unit for each of said wheels, a source of fluid under pressure, a supply pipe for conducting said fluid from said source to said brake units, a steering wheel control device for controlling the flow of fluid through said supply pipe, said device including a member movable upon a steering movement of said steering wheels for automatically releasing the fluid pressure applied to the steering wheel brake units upon a predetermined steering position of the steering wheels.

5. The combination with a pair of steering wheels, of a fluid pressure operated brake unit for each of said wheels, a source of fluid under pressure, a supply pipe for conducting said fluid from said source to said brake units, a return pipe for conducting the fluid away from the brake units, and thereby relieving the braking of the steering wheels, a steering wheel control device including a member movable with one of said steering wheels for controlling the flow of fluid from said source to said brake units and from said brake units to said return pipe, said movable member automatically relieving the fluid pressure applied to the steering wheel brakes after the steering wheels have reached a predetermined angle of steering movement.

6. The combination with a pair of steering wheels, of a fluid pressure operated brake unit for each of said wheels, a source of fluid under pressure, a steering wheel control device comprising a casing forming a chamber, a pair of ports formed in the casing, conduits between said ports and said brake units respectively, a member movable in said chamber and provided with conduits normally communicating with said ports respectively, means for moving said member with said steering wheels, a supply pipe for conducting said fluid from said source to the last said conduits, and means effective upon a predetermined steering movement for placing said ports in communication with said chamber whereby the fluid pressure in the first said conduits is relieved.

7. The combination with a motor vehicle having a plurality of wheels and braking mechanism associated with said wheels for applying a braking effort thereto and a propeller shaft for transmitting power from the motor to said wheels, of means for applying a braking effort to said propeller shaft, a control pedal for operating said propeller braking means and a second control pedal adjacent the first said control pedal for operating the said wheel braking mechanism the relative locations of said pedals permitting simultaneous or selective operation by the foot of the operator of the vehicle.

8. The combination with a motor vehicle having a plurality of wheels and braking mechanism associated with said wheels for applying a braking effort thereto and a propeller shaft for transmitting power from the motor to said wheels, of means for applying a braking effort to said propeller shaft, a control pedal for operating said propeller braking means, and a second control pedal adjacent the first said control pedal for operating the said wheel braking mechanism the relative locations of said pedals permitting simultaneous or selective operation by the foot of the operator of the vehicle, said motor vehicle provided with an accelerator control pedal positioned at right angles with the said second control pedal, whereby the operator may engage each of said accelerator and second said pedals selectively with his foot without shifting his foot laterally or longitudinally.

9. In a brake system for vehicles, a supply tank for storing a fluid under pressure, fluid pressure operated braking means for applying a braking force to some of the wheels of the vehicle, a main control valve for controlling the supply of fluid from said supply tank to the said wheel braking means, a sump, means for conducting the fluid from the wheel braking means to the sump upon release of the braking force, and a pump for conducting the fluid from said sump to the supply tank, a shunt pipe around the pump, and means for by-passing the fluid through said shunt pipe after the pressure of the fluid in the supply tank has reached a predetermined amount.

10. In a brake system for motor vehicles, a supply tank for storing a fluid under pressure, a brake unit associated with a steering wheel of said vehicle, a steering wheel of said vehicle, a steering wheel control device, a main control device for controlling the passage of fluid from said supply tank to said steering wheel control device, means for conducting fluid from the steering wheel control device to said brake unit, a sump, a conduit connecting the sump and said steering wheel control device, means controlled by a predetermined steering movement for conducting the fluid from said brake unit through said conduit to the sump, and a second conduit connecting the sump and main control device for returning the fluid from said brake unit to the sump for steering movements less than that aforesaid.

11. In a brake system for motor vehicles, a supply tank for storing a fluid under pressure, a brake unit associated with a steering wheel of said vehicle, a steering wheel control device, a main control device for controlling the passage of fluid from said supply tank to said steering wheel control device, means for conducting fluid from the steering wheel control device to said brake unit, a sump, a conduit connecting the sump and said steering wheel control device, means controlled by a predetermined steering movement for conducting the fluid from said brake unit through said conduit to the sump, and a second conduit connecting the sump and main control device for returning the fluid from said brake unit to the sump for steering movements less than that aforesaid, and a pump for conducting the fluid from said sump to said supply tank.

12. In a fluid pressure brake system for motor vehicles having a power shaft, a supply tank for storing fluid under pressure, brake units associated with some of the wheels of the vehicle, a brake unit associated with the power shaft of the vehicle, a main control device having means for controlling the supply of fluid to said brake units, a sump, and means controlled by said main control device for conducting the fluid from said brake units to the main control device and thence to said sump.

13. In a fluid pressure brake system for motor vehicles having a power shaft, a supply tank for storing fluid under pressure, brake units associated with some of the wheels of the vehicle, a brake unit associated with the power shaft of the vehicle, a main control device having means for controlling the supply of fluid to said brake units, a sump, and means controlled by said main control device for conducting the fluid from said brake units to the main control device and thence to said sump, a steering wheel control device, and means dependent upon a predetermined steering movement for conducting the fluid from some of the brake units associated with the wheels of the vehicle for conducting the fluid from the last said brake units directly to the sump.

14. In a fluid pressure brake system for motor vehicles having a power shaft, a supply tank for storing fluid under pressure, brake units associated with some of the wheels of the vehicle, a brake unit associated with the power shaft of the vehicle, a main control device having means for controlling the supply of fluid to said brake units, a sump, means controlled by said main control device for conducting the fluid from said brake units to the main control device and thence to said sump, a steering wheel control device, means dependent upon a predetermined steering movement for conducting the fluid from some of the brake units associated with the wheels of the vehicle for conducting the fluid from the last said brake units directly to the sump, a pump for conducting the fluid from said sump to the supply tank, a shunt pipe around the sump, and means for by-passing the fluid through said shunt pipe after the pressure of the fluid has reached a predetermined amount.

15. The combination with a pair of steering wheels, of a fluid pressure operated means for braking said wheels, and means for automatically relieving the fluid pressure applied to the steering wheel brakes after the steering wheels have reached a predetermined angle of steering movement and again applying the brakes automatically when this angle is reduced.

16. The combination with a pair of steering wheels, of a fluid pressure operated means for braking said wheels, and means effective upon steering movement of said wheels for automatically relieving the fluid pressure administered to both front wheel brakes.

In testimony whereof I affix my signature.

THOMAS F. RAINSFORD.